United States Patent
Maier

(10) Patent No.: US 8,720,500 B2
(45) Date of Patent: May 13, 2014

(54) ELECTRICAL ARCHITECTURE FOR PASSIVE CONTROLLER WAKE-UP DURING REFUEL

(75) Inventor: Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 13/270,818

(22) Filed: Oct. 11, 2011

(65) Prior Publication Data

US 2013/0087244 A1 Apr. 11, 2013

(51) Int. Cl.
*B65B 1/30* (2006.01)
*G02F 1/13* (2006.01)

(52) U.S. Cl.
CPC .................................... *G02F 1/1303* (2013.01)
USPC .................. 141/192; 141/3; 141/20; 62/50.2; 340/501

(58) Field of Classification Search
USPC ......... 141/3, 20, 192; 62/50.1–50.7; 340/501, 340/540
See application file for complete search history.

(56) References Cited

U.S. PATENT DOCUMENTS

| | | | | |
|---|---|---|---|---|
| 3,922,876 A | * | 12/1975 | Wetherington et al. | 62/180 |
| 4,856,284 A | * | 8/1989 | Mattiola et al. | 62/50.7 |
| 4,887,857 A | * | 12/1989 | VanOmmeren | 141/1 |
| 5,628,349 A | * | 5/1997 | Diggins et al. | 141/3 |
| 5,868,176 A | * | 2/1999 | Barajas et al. | 141/83 |
| 6,073,081 A | * | 6/2000 | Hettinger et al. | 702/50 |
| 6,619,336 B2 | * | 9/2003 | Cohen et al. | 141/83 |
| 7,565,811 B2 | * | 7/2009 | Taube | 62/50.2 |
| 7,575,012 B2 | * | 8/2009 | Miki et al. | 137/1 |
| 8,286,675 B2 | * | 10/2012 | Farese et al. | 141/94 |
| 8,517,062 B2 | * | 8/2013 | Allidieres et al. | 141/4 |
| 8,534,327 B2 | * | 9/2013 | Inagi et al. | 141/4 |

* cited by examiner

*Primary Examiner* — Timothy L Maust
(74) *Attorney, Agent, or Firm* — John A. Miller; Miller IP Group, PLC

(57) ABSTRACT

A system and method for waking up a vehicle controller during a hydrogen gas refueling process for a high pressure hydrogen storage tank on a fuel cell vehicle. The system includes a first temperature switch mounted to the high pressure tank and enclosed within an insulation housing for monitoring the temperature within the tank and a second temperature switch for monitoring the temperature of the hydrogen gas at the refuel receptacle, where the second temperature switch is also enclosed within an insulation housing. If the temperature within the tank increases above a predetermined temperature, the first switch will close, and if the temperature at the refueling receptacle falls below a predetermined temperature, then the second switch will close, which causes a wake up signal to be provided to the controller to allow the controller to monitor the temperature of the tank.

20 Claims, 1 Drawing Sheet

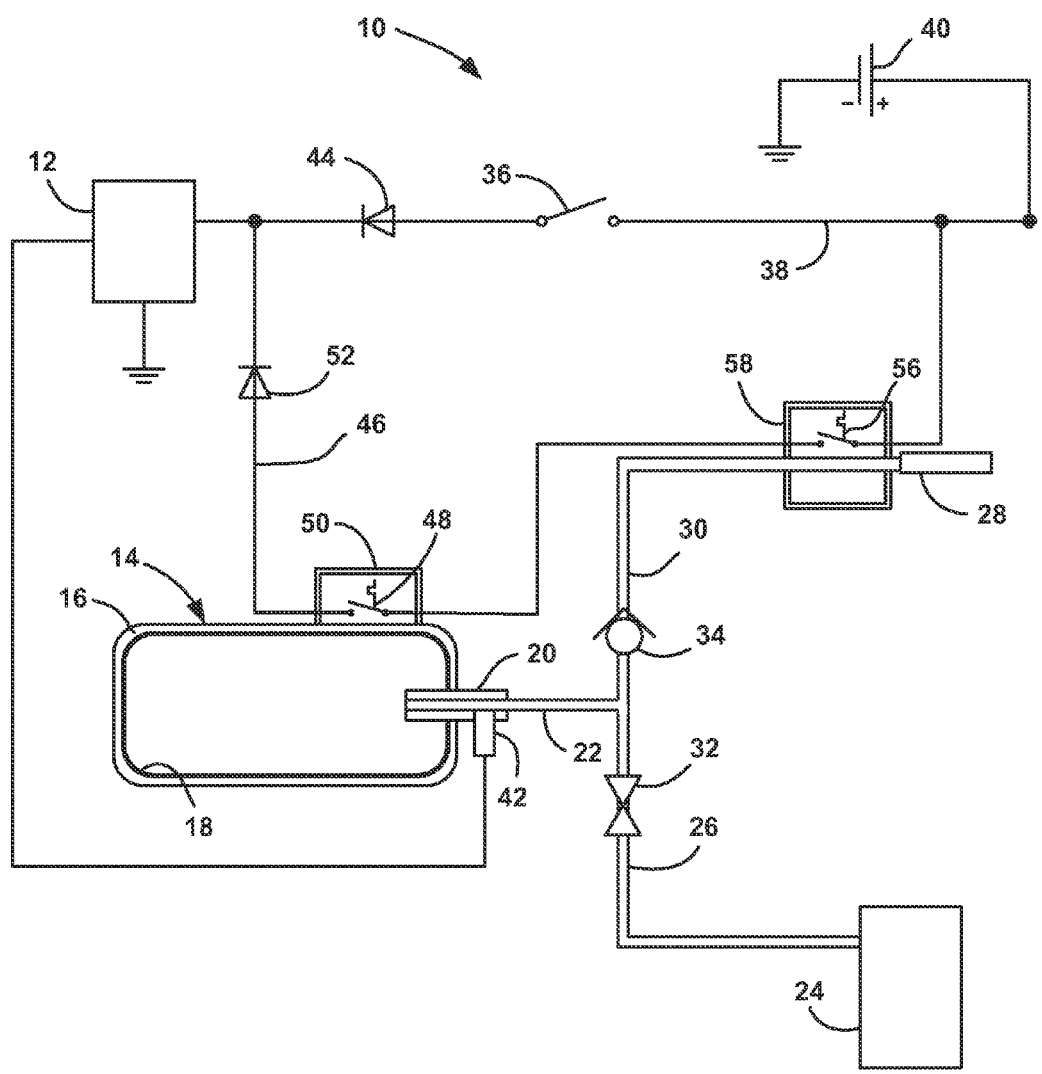

ELECTRICAL ARCHITECTURE FOR PASSIVE CONTROLLER WAKE-UP DURING REFUEL

BACKGROUND OF THE INVENTION

1. Field of the Invention

This invention relates generally to a system and method for waking up a controller during a refueling process of a hydrogen gas storage tank and, more particularly, to a system and method for waking up a controller during a refueling process of hydrogen gas storage tank by monitoring the temperature of the storage tank and the temperature of the hydrogen gas at the refill port when the controller has previously been shut down to conserve battery power.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically, hydrogen gas is stored in one or more compressed gas tanks under high pressure on the vehicle to provide the hydrogen gas necessary for the fuel cell system. The pressure in the tank can be upwards of 700 bar. In one known tank design, the tank includes an inner plastic liner that provides a gas tight seal for the hydrogen gas, and an outer carbon fiber composite layer that provides the structural integrity of the tank. Because hydrogen gas is a very light and diffusive gas, the inner liner and the tank connector components must be carefully engineered in order to prevent leaks. The hydrogen gas is removed from the tank through a pipe. At least one pressure regulator is typically provided that reduces the pressure of the hydrogen gas within the tank to a pressure suitable for the fuel cell system.

The hydrogen gas storage tanks on fuel cell vehicle are refueled at a suitable refueling station where the appropriate receptacles, piping, valves, etc. are provided to couple the tanks to a larger source of hydrogen gas. Often, these types of refueling stations are able to refill the hydrogen gas storage tanks on the vehicle very quickly by providing a fast flow of hydrogen gas at a significantly higher pressure. If the hydrogen gas storage tank is near empty and at low pressure, the fast flowing hydrogen gas entering the tank will quickly expand, causing it to significantly and quickly increase in temperature. Typically, the temperature within the tank will not significantly increase if there is a high enough pressure within the tank during the refueling process. Because the inner liner of the tank providing the gas tight seal is a polymer, high temperatures within the tank have a degrading effect on the liner, which could ultimately lead to loss of seal integrity over time and a number of refueling events. Because of this concern, it is known in the art to provide a temperature sensor on the tank that monitors the temperature of the hydrogen gas during a refueling event, where the temperatures are recorded during refueling over time. An algorithm is provided to determine the durable life of the liner based on how often the temperature precedes a predetermined temperature and for how long.

Some refueling stations are SAE approved and receive communications signals from the vehicle during the refueling process. For SAE approved refueling stations, the various temperature and pressure signals are observed by the vehicle. Other refueling stations may not be SAE approved, where the vehicle independently needs to monitor the temperature of the tank during the refueling process using the temperature sensor.

In one known fuel cell system design, the refueling door or flap that is opened during the refueling process to expose the refueling receptacle that is connected to the refueling station has a switch that is closed when the flap is open to provide a signal to a vehicle controller that a refueling event is about to begin. If the vehicle is off, the controller will wake-up when the switch is closed in anticipation that refueling will soon commence to record the temperature signals from the temperature sensor when monitoring the flow of the hydrogen gas to the tank. There is also an observation of the tank pressure and the hydrogen concentration. In some situations, the vehicle driver may open the refueling flap, but not immediately begin the refueling process. Because the battery state-of-charge of the low volt battery on the vehicle has limited charge and is not recharged when the vehicle is off, algorithms are provided to reduce or control the power draw from the battery. In one design, the controller that monitors the flap switch will only stay woken up for a certain time after the switch is closed, and if the refueling process is not initiated during that time, will shut down to save battery power even though the flap switch is closed. If the driver then performs the refueling process after the controller has shut down, the controller will not be able to monitor the temperature and pressure during that refueling event, which could have consequences for determining the usable life of the tank.

SUMMARY OF THE INVENTION

In accordance with the teachings of the present invention, a system and method are disclosed for waking up a vehicle controller during a hydrogen gas refueling process for a high pressure hydrogen storage tank on a fuel cell vehicle. The system includes a first temperature switch mounted to the high pressure tank and enclosed within an insulation housing for monitoring the temperature within the tank and a second temperature switch for monitoring the temperature of the hydrogen gas at the refuel receptacle, where the second temperature switch is also enclosed within an insulation housing. If the temperature within the tank increases above a predetermined temperature, the first switch will close, and if the temperature at the refueling receptacle falls below a predetermined temperature, then the second switch will close, which causes a wake up signal to be provided to the controller to allow the controller to monitor the temperature of the tank.

Additional features of the present invention will become apparent from the following description and appended claims, taken in conjunction with the accompanying drawings.

BRIEF DESCRIPTION OF THE DRAWING

FIG. 1 is a simplified schematic view of a fuel cell system showing an electrical architecture for waking up a controller during a hydrogen storage tank refueling process.

DETAILED DESCRIPTION OF THE EMBODIMENTS

The following discussion of the embodiments of the invention directed to a system and method for waking up a controller during a refueling event of a hydrogen storage tank is merely exemplary in nature, and is in no way intended to limit the invention or its applications or uses. For example, the present invention has application for monitoring the refueling of a high pressure hydrogen gas storage tank on a fuel cell vehicle. However, as will be appreciated by those skilled in the art, the system and method of the invention may have application for other systems.

FIG. 1 is a schematic diagram of a system 10 showing an electrical architecture for waking up an electronic control unit (ECU) 12 at the initiation of a refueling process of a high pressure hydrogen gas storage tank 14. The high pressure tank 14 is the type referred to above having an outer composite layer 16 providing structural integrity and an inner gas tight liner layer 18 providing a gas tight seal. The system 10 could be on a fuel cell vehicle, where multiple gas storage tanks may be provided. The tank 14 also includes an adaptor 20 including various valves and sealing devices, well known to those skilled in the art, that allows the hydrogen gas within the tank 14 to exit the tank 14 and hydrogen gas from a refueling station (not shown) to enter the tank 14 in a controlled manner through a pipe 22. In this non-limiting embodiment, the hydrogen gas stored within the tank 14 provides fuel for a fuel cell stack 24 through a pipe 26. The tank 14 is refueled by connecting a receptacle 28 to a suitable refueling port (not shown) that allows the hydrogen gas to flow into the tank 14 through a pipe 30. A check valve 34 is provided in the pipe 30 to prevent flow to the receptacle 28. A valve 32 switches the flow through the pipe 22 in a manner that is well understood by those skilled in the art.

As discussed above, it is desirable to monitor the temperature within the tank 14 during a refueling event to provide knowledge that can be used to determine whether the temperature is having a degrading affect on the liner layer 18, and if so, how much, for tank integrity purposes. An electrical line 38 is electrically coupled to the ECU 12 and a positive terminal of a low-voltage battery 40 on the vehicle. A flap switch 36 is provided in the electrical line 38 that is closed when the refueling port cover flap (not shown) on the vehicle is opened to expose the receptacle 28 during the refueling process. When the switch 36 is closed, a voltage signal from the battery 40 on the electrical line 38 is provided to the ECU 12 that wakes-up and tells the ECU 12 that a refueling event is about to take place, and that the ECU 12 should monitor the temperature during the refueling process. A temperature sensor 42 is provided at a suitable location on the tank, here in the adaptor 20, that measures the temperature of the hydrogen gas flowing through the pipe 22 and into the tank 14. Temperature signals from the temperature sensor 42 are provided to the ECU 12 that are then used in the algorithm to monitor the integrity of the liner layer 18 in a manner that is well understood by those skilled in the art. A diode 44 is provided within the electrical line 38 that prevents signals from traveling back to the battery 40.

As discussed above, there may be a situation where the vehicle operator will open the refueling flap causing the switch 36 to close and the ECU 12 to wake-up in anticipation of a refueling event, but where the operator does not immediately initiate the refueling process. Because it is necessary to conserve the power of the battery 40 when the vehicle is off, the ECU 12 will only stay in the on state for some period of time, such as one-half hour, after the switch 36 is closed, after which the ECU 12 will shut-down to conserve battery power. There is still battery power to perform the temperature monitoring process during the refueling, but the algorithm shuts down the ECU 12 anyway so that there is plenty of battery power for the next vehicle start-up process. Because the ECU 12 is woken up based on an electrical state change, such as the rising edge of the voltage signal, even though the switch 36 may remain in the closed position, the ECU 12 will not wake up unless another state change occurs.

The present invention proposes a technique for waking up the ECU 12 for those times when the switch 36 has been closed, but the refueling process has not been initiated before the ECU 12 has been shut-down due to time for battery power conservation purposes so that the temperature and pressure signals, and the hydrogen observation, of the tank 14 can be monitored during that refueling event. Particularly, a second electrical line 46 in parallel with the line 38 is electrically coupled to the positive terminal of the battery 40 and the ECU 12. As above, a diode 52 is provided in the electrical line 46 to prevent electrical signals from propagating back down the line 46. A normally open temperature switch 48 is mounted to an outside wall of the tank 14 to monitor the temperature of the tank 14, where the switch 48 closes if the temperature of the tank 14 increases above a temperature set-point of the switch 48. The temperature set-point of the switch 48 is calibrated and can be any temperature suitable for the purposes discussed herein that would be based on many factors, such as the type of switch, the position of the switch 48, the size of the tank 14, etc. The temperature switch 48 is enclosed within a suitable thermal insulation housing 50 so that the temperature sensed by the switch 48 is not affected by the ambient. The thickness and material of the housing 50 can be any low-weight, inexpensive insulation material suitable for the purposes discussed herein.

If the switch 48 was the only switch in the electrical line 46, then closing the switch 48 would provide the state change voltage signal to the ECU 12. Because there may be certain times during operation of the fuel cell vehicle where the temperature in and around the tank 14 increases above the temperature set-point of the switch 48 as a result of its location relative to the fuel cell stack 12 and/or the temperature of the environment, the switch 48 may close even though the switch 36 is open, which could otherwise cause the voltage signal applied to the ECU 12 to erroneously start taking temperature measurements from the temperature sensor 42.

To prevent this occurrence, a second temperature switch 56 is provided at or near the receptacle 28 that monitors the temperature of the receptacle 28 during a refueling event. The switch 56 is a normally closed switch in that it is in an open position unless it senses a temperature below a predetermined temperature set-point. Because the hydrogen gas heats up significantly when it expands within the tank 14, as discussed above, the refueling stations typically provide the hydrogen gas at a very low temperature, such as −30° C. or less, which is a requirement for SAE compliant refuel stations. Therefore, the temperature switch 56 has a temperature set-point that is calibrated to the gas refueling temperature so that if the temperature falls below the set-point, the switch 56 will close. If both of the switches 48 and 56 are closed at the same time, the voltage signal from the battery 40 is provided to the ECU 12 on the electrical line 46. The temperature switch 56 is also enclosed within a thermal insulation housing 58 so that the environment or ambient temperature does not significantly affect switching of the switch 56. Thus, if the temperature switch 48 indicates a high tank temperature, but the temperature switch 56 does not indicate a low temperature fuel flow, then the ECU 12 will not take temperature measurements from the temperature sensor 42. The switch 56 typically cannot be used alone because there may be occurrences where the environmental temperature is low enough to cause the switch 56 to close. Thus, by providing the switch 48 that only switches at high temperature and the switch 56 that only closes at low temperature, the signal on the line 46 to the ECU 12 will only be provided during the refueling process.

If the fuel cell system 10 includes multiple high pressure gas storage tanks with different volumes, the switch 48 would be mounted to the most critical tank. If all of the tanks need to be observed, then the switches 48 for each of the tanks 14 would be electrically coupled in parallel.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system comprising:
a high pressure gas storage tank;
a refueling tube in fluid communication with the tank;
a refueling receptacle coupled to an end of the refueling tube opposite to the tank and being adapted to accept a refueling device that allows gas to flow through the refueling tube and into the tank;
a temperature sensor mounted on or proximate to the tank for measuring the temperature of the tank and providing temperature signals indicative of the temperature of the tank;
a controller responsive to the temperature signals from the temperature sensor;
a power source providing a supply voltage to the controller on a first electrical line; and
a first temperature switch mounted to the tank and being electrically coupled to the first electrical line, said first temperature switch having a first temperature set-point such that if the first temperature switch detects a temperature above the first temperature set-point the first temperature switch will close and allow the supply voltage from the power source to be provided to the controller.

2. The system according to claim 1 further comprising a thermal housing surrounding the first temperature switch and insulating the first temperature switch from ambient.

3. The system according to claim 1 further comprising a second temperature switch electrically coupled to the first electrical line, said second temperature switch being mounted to or near the refueling receptacle, said second temperature switch having a second temperature set-point such that if the second temperature switch detects a temperature below the second temperature set-point caused by a flow of gas through the receptacle and the refueling tube the second temperature switch will close and allow the supply voltage to be provided to the power source to the controller.

4. The system according to claim 3 further comprising a thermal housing enclosing the second temperature switch and insulating the second temperature switch from ambient.

5. The system according to claim 1 further comprising a second electrical line being electrically coupled to the controller and the power source, said second electrical line including a refueling switch that is closed to allow the supply voltage from the power source to be provided to the controller.

6. The system according to claim 5 wherein the refueling switch is a flap switch mounted to a refueling door on a vehicle that closes when the refueling door is opened.

7. The system according to claim 1 wherein the tank includes an outer composite structural layer and an inner gas tight sealing layer.

8. The system according to claim 1 wherein the tank is a hydrogen gas storage tank.

9. The system according to claim 8 further comprising a fuel cell stack that receives the hydrogen gas from the hydrogen gas storage tank.

10. The system according to claim 9 wherein the system is on a fuel cell vehicle.

11. A system on a fuel cell vehicle, said system comprising:
a high pressure hydrogen gas storage tank;
a refueling tube in fluid communication with the tank;
a refueling receptacle coupled to an end of the refueling tube opposite to the tank and being adapted to accept a refueling device that allows hydrogen gas to flow through the refueling tube and into the tank;
a temperature sensor mounted on or proximate to the tank for measuring the temperature of the tank and providing temperature signals indicative of the temperature of the tank;
a controller responsive to the temperature signals from the temperature sensor;
a battery providing a supply voltage to the controller on a first electrical line;
a first temperature switch mounted to the tank and being electrically coupled to the first electrical line, said first temperature switch having a first temperature set-point such that if the first temperature switch detects a temperature above the first temperature set-point the first temperature switch closes and allows the supply voltage from the power source to be provided to the controller;
a first thermal housing surrounding the first temperature switch and insulating the first temperature switch from ambient;
a second temperature switch mounted to or near the refueling receptacle and being electrically coupled to the first electrical line, said second temperature switch having a second temperature set-point such that if the second temperature switch detects a temperature below the second temperature set-point the second temperature switch closes and allows the supply voltage from the power source to be provided to the controller; and
a second thermal housing enclosing the second temperature switch and insulating the second temperature switch from ambient.

12. The system according to claim 11 further comprising a second electrical line being electrically coupled to the controller and the power source, said second electrical line including a refueling switch that is closed to allow the supply voltage from the power source to be provided to the controller.

13. The system according to claim 12 wherein the refueling switch is a flap switch mounted to a refueling door on a vehicle that closes when the refueling door is opened.

14. The system according to claim 11 wherein the tank includes an outer composite structural layer and an inner gas tight sealing layer.

15. A system comprising:
a high pressure gas storage tank;
a refueling tube in fluid communication with the tank;

a refueling receptacle coupled to an end of the refueling tube opposite to the tank and being adapted to accept a refueling device that allows gas to flow through the refueling tube and into the tank;

a temperature sensor mounted on or proximate to the tank for measuring the temperature of the tank and providing temperature signals indicative of the temperature of the tank;

a controller responsive to the temperature signals from the temperature sensor;

a power source providing a supply voltage to the controller on a first electrical line; and a temperature switch mounted to or near the refueling receptacle and being electrically coupled to the first electrical line, said temperature switch having a temperature set-point such that if the temperature switch detects a temperature below the temperature set-point the temperature switch closes and allows the supply voltage from the power source to be provided to the controller.

16. The system according to claim 15 further comprising a thermal housing enclosing the temperature switch and insulating the temperature switch from ambient.

17. The system according to claim 15 further comprising a second electrical line being electrically coupled to the controller and the power source, said second electrical line including a refueling switch that is closed to allow the supply voltage from the power source to be provided to the controller.

18. The system according to claim 17 wherein the refueling switch is a flap switch mounted to a refueling door on a vehicle that closes when the refueling door is opened.

19. The system according to claim 15 wherein the tank includes an outer composite structural layer and an inner gas tight sealing layer.

20. The system according to claim 15 wherein the tank is a hydrogen gas storage tank, said system further comprising a fuel cell stack that receives the hydrogen gas from the hydrogen gas storage tank.

* * * * *